United States Patent
Zhu et al.

(10) Patent No.: US 12,423,954 B1
(45) Date of Patent: Sep. 23, 2025

(54) IMAGE RECOGNITION METHOD, DEVICE, ELECTRONIC DEVICE, AND STORAGE MEDIUM

(71) Applicants: Beijing Jiaotong University, Beijing (CN); Ganzhou Innovation Institute of Intelligent Industry, Ganzhou (CN)

(72) Inventors: Minghao Zhu, Beijing (CN); Zhaojian Liu, Beijing (CN); Qifeng Wang, Beijing (CN); Xuehan Li, Beijing (CN); Qinghe Gao, Beijing (CN); Yan Huo, Beijing (CN); Hao Wu, Beijing (CN)

(73) Assignees: Beijing Jiaotong University, Beijing (CN); Ganzhou Innovation Institute of Intelligent Industry, Ganzhou (CN)

( * ) Notice: Subject to any disclaimer, the term of this patent is extended or adjusted under 35 U.S.C. 154(b) by 0 days.

(21) Appl. No.: 19/185,713

(22) Filed: Apr. 22, 2025

(30) Foreign Application Priority Data

Apr. 25, 2024 (CN) .......................... 202410505446.3

(51) Int. Cl.
*G06V 10/77* (2022.01)
*G06V 10/82* (2022.01)

(52) U.S. Cl.
CPC .......... *G06V 10/7715* (2022.01); *G06V 10/82* (2022.01)

(58) Field of Classification Search
CPC ............................. G06V 10/7715; G06V 10/82
See application file for complete search history.

(56) References Cited

FOREIGN PATENT DOCUMENTS

| CN | 111126410 A | | 5/2020 | |
|---|---|---|---|---|
| CN | 113361546 A | * | 9/2021 | ........... G06F 18/241 |
| CN | 114241598 A | * | 3/2022 | ........... G06F 18/253 |
| CN | 114332620 A | * | 4/2022 | |
| CN | 114359819 A | | 4/2022 | |
| CN | 115063573 A | * | 9/2022 | ............ G06V 10/20 |
| CN | 115705689 A | * | 2/2023 | |
| CN | 115713632 A | * | 2/2023 | |
| CN | 116758407 A | | 9/2023 | |
| CN | 116994264 A | * | 11/2023 | ............ G06V 30/18 |
| CN | 117437615 A | | 1/2024 | |

OTHER PUBLICATIONS

First Office Action issued in counterpart Chinese Patent Application No. 202410505446.3, dated Aug. 20, 2024.
Li, Research On Hyperspectral Image Classification With Convolutional Feature Learning Network, Doctoral Thesis submitted to Harbin Institute of Technology, dated Nov. 2, 2022.

* cited by examiner

*Primary Examiner* — Ross Varndell
(74) *Attorney, Agent, or Firm* — Westbridge IP LLC

(57) ABSTRACT

Disclosed is an image recognition method, an image recognition device, an electronic device, and a storage medium. In the image recognition method, an image is acquired and inputted into a pre-built recognition model to determine an initial feature corresponding to the image via the recognition model. Then, the initial feature is divided into multiple groups according to a predetermined channel dimension. Further, feature extractions are performed on the multiple groups of the initial feature to obtain intermediate features corresponding to the multiple groups. Then the intermediate features are fused to obtain a final feature. Finally, a recognition result is output corresponding to the image via the recognition model based on the final feature.

4 Claims, 2 Drawing Sheets

IMAGE RECOGNITION METHOD, DEVICE, ELECTRONIC DEVICE, AND STORAGE MEDIUM

CROSS-REFERENCE TO RELATED APPLICATIONS

This application claims priority to Chinese Patent Application No. 202410505446.3, filed on Apr. 25, 2024, the content of which is incorporated herein by reference in its entirety.

TECHNICAL FIELD

The present application relates to data processing technologies, and in particular, to an image recognition method, an image recognition device, an electronic device, and a storage medium.

BACKGROUND

With a rapid development of deep learning and computer vision technologies, transportation systems and autonomous driving have gradually become hotspots in researches and applications. Existing deep learning-based recognition algorithms have been widely used in vehicle recognition. However, challenges remain when processing complex real-world traffic scenarios. For examples, due to variations in vehicle shapes and scales, especially for small target vehicles, the recognition accuracy of existing algorithms decreases. Further, under adverse weather conditions, reduced visibility makes it difficult for existing algorithms to locate and distinguish vehicles in images. Moreover, dense traffic flow and occlusion phenomena may obscure key features of vehicles, leading to missed detections and false alarms. These challenges result in a relatively low accuracy of deep learning-based recognition algorithms in vehicle recognitions.

SUMMARY

In view of the above, the present disclosure provides an image recognition method, an image recognition device, an electronic device, and a storage medium to overcome all or part of the deficiencies in the prior art.

The image recognition method according to examples of the present disclosure may comprise: acquiring an image and inputting the image into a pre-constructed recognition model to determine an initial feature corresponding to the image via the recognition model; dividing the initial feature into multiple groups according to a predetermined channel dimension, performing feature extractions on the multiple groups of the initial feature to obtain intermediate features corresponding to the multiple groups of the initial feature, and fusing the intermediate features to obtain a final feature; and outputting a recognition result corresponding to the image via the recognition model based on the final feature.

Optionally, the recognition model may comprise a spatial attention mechanism, a channel attention mechanism, and a cross-channel coordinated attention mechanism. The step of determining initial feature corresponding to the image via the recognition model may comprise: extracting a first sub-feature from the image via the cross-channel coordinated attention mechanism, extracting a second sub-feature via the spatial attention mechanism, and extracting a third sub-feature via the channel attention mechanism; and fusing the first sub-feature, the second sub-feature, and the third sub-feature to obtain the initial feature corresponding to the image.

Optionally, the step of extracting the first sub-feature via the cross-channel coordinated attention mechanism may comprise: determining the first sub-feature using the following formula:

$$y(p) = \sum_{k=1}^{K} \psi[w_k x(p + p_k + \Delta p_k) \Delta m_k]$$

Where $y(p)$ represents the first sub-feature, $\psi$ represents applying the cross-channel coordinated attention mechanism to offsets generated by a deformable convolution to optimize sampling positions, $w_k$ represents a weight of a k-th position in a deformable convolution kernel, $p$ represents the image, $p_k$ represents a predetermined offset at the k-th position of the deformable convolution kernel, $\Delta p_k$ represents a learnable offset at the k-th position of the deformable convolution kernel, $\Delta m_k$ represents a modulation scalar at the k-th position of the deformable convolution kernel, and $x(\ )$ represents an operation on the image.

Optionally, the step of extracting the second sub-feature via the spatial attention mechanism may comprise: determining the second sub-feature using the following formula:

$$g_c^h(i) = g_c^w(i) = \sigma_1(f_c^h(i) \times \tilde{f}_c^h(i)) \times \sigma_1(f_c^w(i) \times \tilde{f}_c^w(i))$$

Where $g_c^h(i) \times g_c^w(i)$ represents the second sub-feature, $\sigma_1$ represents a first Sigmoid activation function, $f_c^h(i)$ represents an image feature output in a vertical direction in a c-th channel of the recognition model, $\tilde{f}_c^h(i)$ represents a weight of the image feature output in the vertical direction in the c-th channel of the recognition model, $f_c^w(i)$ represents an image feature output in a horizontal direction in the c-th channel of the recognition model, and $\tilde{f}_c^w(i)$ represents a weight of the image feature output in the horizontal direction in the c-th channel of the recognition model.

Optionally, the step of extracting the third sub-feature via the channel attention mechanism may comprise: determining the third sub-feature using the following formula:

$$g_c = \sigma_2 \left\{ \left[ \frac{1}{H \cdot W} \sum_{0 \le i \le H} \sum_{0 \le j \le H} x_c(i, j) \right] \times \left[ \frac{1}{W + H} \sum_{i=1}^{W+H} \tilde{f}_c(i) \right] \right\}$$

Where $g_c$ represents the third sub-feature, $\sigma_2$ represents a second Sigmoid activation function, $H$ represents a total height for encoding channels along the vertical direction, $W$ represents a total width for encoding channels along the horizontal direction, $x_c(i,j)$ represents a coordinate of the image, and $\tilde{f}_c(i)$ represents a position weight of the image in the c-th channel of the recognition model.

Optionally, the step of fusing the first sub-feature, the second sub-feature, and the third sub-feature to obtain the initial feature may comprise: performing a multiplicative operation on the first sub-feature, the second sub-feature, and the third sub-feature to obtain the initial feature.

Optionally, the recognition model may comprise a deformable convolution layer. The step of performing feature extractions on the multiple groups of the initial feature to obtain intermediate features corresponding to the multiple groups of the initial feature may comprise: for each group of the initial feature, selecting one convolution kernel from all convolution kernels in the deformable convolution layer randomly to perform a feature extraction on the group of the initial feature, thereby obtaining the intermediate features.

Based on the same inventive concept, the present disclosure further provides an image recognition device, comprising: a determination module, configured to acquire an image, input the image into a pre-constructed recognition model, and determine an initial feature corresponding to the image through the recognition model; an extraction module, configured to divide the initial feature into multiple groups according to a predetermined channel dimension, perform feature extractions on the multiple groups of the initial feature to obtain intermediate features corresponding to the multiple groups of the initial feature, and fuse the intermediate features to obtain a final feature; and an output module, configured to output a recognition result corresponding to the image through the recognition model based on the final feature.

Based on the same inventive concept, the present disclosure further provides an electronic device comprising a memory, a processor, and a computer program stored on the memory and executable by the processor, wherein the processor executes the computer program to implement the method described above.

Based on the same inventive concept, the present disclosure further provides a non-transitory computer-readable storage medium storing computer instructions, wherein the computer instructions are used to cause a computer to execute the method described above.

As can be seen from the above, the image recognition method, the image recognition method device, the electronic device, and the storage medium provided in the present disclosure may include acquiring an image, inputting the image into a pre-constructed recognition model, and determining an initial feature corresponding to the image through the recognition model, thereby achieving the purpose of determining features of the image preliminarily and accurately. The initial feature then is divided into multiple groups according to a predetermined channel dimension, a feature extraction is performed respectively on each group to obtain intermediate features, all intermediate features are fused to obtain a final feature, which captures multi-scale receptive fields, thereby improving detection capability for multi-scale features effectively and achieving a purpose of determining the final feature of the image accurately. Based on the final feature, the recognition model may output a recognition result corresponding to the image, achieving a purpose of recognizing the image accurately.

BRIEF DESCRIPTION OF THE DRAWINGS

To illustrate technical solutions of the present disclosure or the prior art more clearly, drawings used in examples or the prior art will be briefly introduced. Obviously, the drawings in the following description are only some examples of the present disclosure. For those of ordinary skill in the art, other drawings may be obtained based on these drawings without creative effort.

DETAILED DESCRIPTION OF THE EMBODIMENTS

To make the objectives, technical solutions, and advantages of the present disclosure clearer, the following further describes the present disclosure in detail with reference to specific examples and accompanying drawings.

It should be noted that, unless otherwise defined, technical terms or scientific terms used in the examples of the present disclosure shall have the ordinary meanings understood by persons skilled in the art. The terms "first," "second," and similar terms used in the examples of the present disclosure do not denote any order, quantity, or importance, but are merely used to distinguish different components. The terms "comprising" or "including" and similar terms mean that elements or items preceding the term encompass elements or items listed after the term and their equivalents, but do not exclude other elements or items. The terms "connected" or "coupled" and similar terms are not limited to physical or mechanical connections, but may include electrical connections, whether direct or indirect. Terms such as "upper," "lower," "left," and "right" are used only to indicate relative positional relationships. When the absolute position of the described object changes, the relative positional relationship may also change accordingly.

As described in the background section, with the rapid development of deep learning and computer vision technologies, transportation systems and autonomous driving have gradually become hotspots in research and applications. As one of the important foundations of transportation systems and autonomous driving, vehicle recognition algorithms have attracted significant attention. When deploying vehicle recognition algorithms on edge devices with limited computational resources, accuracy and real-time performance pose dual challenges. Therefore, deep learning-based algorithms with stronger robustness and accuracy are gradually replacing traditional algorithms as mainstream vehicle recognition algorithms.

Existing deep learning-based recognition algorithms are widely used in vehicle recognition. However, challenges remain when processing complex real-world traffic scenarios. For example, due to the variability in vehicle shapes and scales, especially for small-target vehicles, the recognition accuracy of existing algorithms decreases. Further, under adverse weather conditions, reduced visibility makes it difficult for existing algorithms to locate and distinguish vehicles in images. Moreover, dense traffic flow and occlusions may obscure key features of vehicles, leading to missed detections and false alarms. These challenges result in a relatively low accuracy of deep learning-based recognition algorithms in vehicle recognition.

Figure 1:
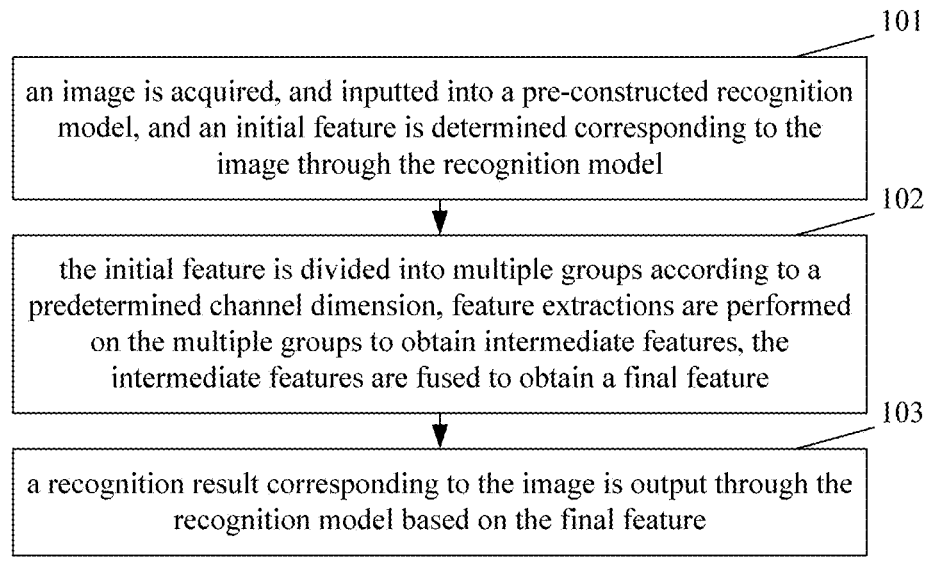
FIG. 1 is a flowchart of an image recognition method according to an example of the present disclosure.

In view of this, an example of the present disclosure proposes an image recognition method. Referring to FIG. 1, the method may include the following steps:

In Step 101, an image is acquired, and inputted into a pre-constructed recognition model, and an initial feature is determined corresponding to the image through the recognition model.

In this step, the acquired image may be an image containing vehicles. Recognizing vehicles in the image accurately may contribute to the development of transportation systems and autonomous driving. The image may come from various sources. For example, the image may be captured from ordinary roads or highways where vehicles are traveling. The image is input into the pre-constructed recognition model for a preliminary feature extraction. The recognition model may determine the initial feature corresponding to the image, achieving a purpose of determining the feature of the image preliminarily and accurately.

It should be noted that the recognition model may be trained using a training dataset. When the training dataset is a vehicle dataset, the recognition model is a vehicle recognition model. The vehicle dataset may be obtained through Python crawlers, surveillance cameras, existing datasets, etc. The images in the vehicle dataset may be photos of ordinary roads and/or highways under different lighting conditions, weather conditions, and scenarios. The vehicle samples in the images may be pre-classified. For example, they may be classified into four common categories: cars, buses, trucks, and other vehicles. A labeling tool (e.g., Labeling) may be used to annotate rectangular bounding boxes for all vehicle samples in the images. The corresponding annotation labels may be output in YOLO data format, where YOLO data format refers to the data annotation format used by the YOLO algorithm (You Only Look Once, an object detection and localization algorithm based on deep neural networks) for training and testing the recognition model. The images and corresponding labels may be integrated to create the vehicle dataset, which may be divided into a training set, a validation set, and a test set according to a predetermined ratio (e.g., 8:1:1). The vehicle dataset may then be augmented using a Mosaic data augmentation algorithm to enhance its generalizability. The Mosaic data augmentation algorithm involves scaling and stitching four or more images, adjusting the coordinates of bounding boxes, and processing edge-located bounding boxes. This algorithm may enhance data diversity and model robustness while improving detection performance for small targets, thereby enabling the trained recognition model to identify relatively small targets in images accurately.

The improved YOLO algorithm may be iteratively trained with specified training parameters. Binary Cross Entropy (BCE) may be used as the classification loss. For each category, the model may determine whether the image belongs to that category, output a "confidence score" for each category directly, take a maximum value as the "confidence" of the anchor box, and measure the difference between actual labels and model predictions. The classification loss function for training the recognition model may be determined by:

$$BCELoss = -\frac{1}{N}\sum_{n=1}^{N}[y_n \log(p_n) + (1 - y_n)\log(1 - p_n)] \quad \text{formula (1)}$$

Where BCELoss represents the classification loss function, N represents the number of image samples, $y_n$ represents the true label, and $p_n$ represents the predicted probability of the image sample by the recognition model.

Complete Intersection over Union (CIOU) may be used as the regression loss. In regression tasks, the ratio between the "target box" and the "predicted box" may be used to measure the regression degree of the box. CIOU loss may optimize the overlap area, center distance, and aspect ratio to better fit the target box. The calculation may be as follows:

$$CIOU\ Loss = 1 - IoU + \frac{d^2}{\max(R^2, T^2)} \quad \text{formula (2)}$$

Where CIOU Loss represents a first regression loss, IoU represents an Intersection over Union between the ground truth and prediction boxes, $d^2$ represents a Euclidean distance between box centers, $R^2$ represents an area of the real bounding box, and $T^2$ represents an area of the predicted bounding box.

To enhance a generalization, a Distribution Focal Loss (DFL) may be added to YOLOv8. DFL may optimize probabilities around the label using cross-entropy, enabling the network to focus on target positions and adjacent regions. This improves the generalization of the model in complex scenarios (e.g., occlusions, moving objects). The calculation may be as follows:

$$DFL(S_i, S_{i+1}) = -((y_{i+1} - y_i)\log(S_i) + (y - y_i)\log(S_{i+1})) \quad \text{formula (3)}$$

Where $DFL(S_i, S_{i+1})$ represents a second regression loss, y represents a true value, $y_{i+1}$ represents an adjacent predicted value, and $y_i$ represents a predicted value.

In YOLOv8, the first regression loss (CIOU) and the second regression loss (DFL) may be combined. DFL may optimize boundary box distribution probabilities, while CIOU may optimize an overall prediction box. Early stopping may be applied during the training to save the optimal model. The final weight file may recognize vehicle types (cars, buses, trucks, others) with high accuracy and speed across various scenarios.

In Step 102, the initial feature is divided into multiple groups according to a predetermined channel dimension, feature extractions are performed on the multiple groups to obtain intermediate features, the intermediate features are fused to obtain a final feature.

In this step, to address unclear or occluded targets in the image, the initial feature undergoes detailed extraction to obtain intermediate features. All intermediate features are fused to form the final feature. A Multi-scale Grouped Convolution (MGConv) may be proposed to enhance multi-scale detection capability. MGConv may split the input feature into groups along channels:

$$z = \text{Channel Split}(f) \quad \text{formula (4)}$$

Where Channel Split(f) may split the initial feature. Each group may select convolution kernels of different sizes randomly for depthwise convolution to capture multi-scale receptive fields. A 1×1 pointwise convolution then combines features across channels:

$$f' = Conv_{1\times 1}\left(\sum_{i=1}^{4} Conv_i(z_i)\right) \quad \text{formula (5)}$$

Where the detection head (MGhead) may use kernel sizes {1×1, 3×3, 5×5, 7×7}. MGConv may reduce parameters and computational costs by decoupling spatial and channel correlations. Parameter sharing may be applied to merge classification and regression branches, significantly reducing the model head size. The MGConv and ICBS (composed of Conv, BN, and SiLU layers) modules form the backbone of the YOLOv8 detection head, with two standard convolutions serving as classification and regression branches.

By obtaining the final features and capturing the multi-scale perception field, the detection ability of multi-scale features may be effectively improved, and the purpose of determining the final features of the image accurately may be achieved.

In Step 103, a recognition result corresponding to the image is output through the recognition model based on the final feature.

In this step, the final feature may reflect the characteristics of the image accurately and comprehensively. Even if the image suffers from blurriness or occlusion, the recognition model can determine the final feature accurately. Based on the final feature, the recognition model may output the corresponding recognition result for the image, achieving the purpose of identifying the image accurately. For example, when a partially occluded target (e.g., a car) exists in the image, the recognition model may output "car" as the recognition result. When an unclear target (e.g., a truck) exists in the image, the recognition model may output "truck" as the recognition result.

Through the above solution, the image may be acquired and input into the pre-constructed recognition model. The recognition model may determine the initial feature corresponding to the image, achieving the purpose of identifying characteristics of the image preliminarily and accurately. The initial feature may be divided into multiple groups according to a predetermined channel dimension, and feature extractions may be performed on the multiple groups of the initial feature to obtain intermediate features. All intermediate features may then be fused to obtain the final feature, capturing multi-scale receptive fields, thereby improving the detection capability for multi-scale features effectively and achieving the purpose of determining the final feature of the image accurately. Based on the final feature, the recognition model may output the recognition result for the image, achieving the purpose of identifying the image accurately.

In some examples, the recognition model may comprise a spatial attention mechanism, a channel attention mechanism, and a cross-channel coordinated attention mechanism. The initial feature corresponding to the image may be determined through the following steps: extracting a first sub-feature from the image through the cross-channel coordinated attention mechanism; extracting a second sub-feature from the image through the spatial attention mechanism; extracting a third sub-feature from the image through the channel attention mechanism; and fusing the first sub-feature, the second sub-feature, and the third sub-feature to obtain the initial feature of the image.

In this example, geometric variations caused by factors such as scale, posture, angle, or partial deformation of the target to be recognized in the image may reduce the accuracy of conventional recognition models. Therefore, deformable convolution may be introduced into the recognition model to enhance its adaptability to deformed targets. When using deformable convolution, the sampling positions are no longer standard rectangular regions as in conventional convolution but incorporate learnable offsets and feature magnitudes to adjust sampling positions to match the appearance of the target. To further refine the coverage of sampling positions in deformable convolution, a cross-channel coordinated attention (CCA) mechanism may be introduced. Combined with the spatial attention mechanism and channel attention mechanism, features may be extracted from the image to obtain the first sub-feature, second sub-feature, and third sub-feature. The attention mechanism focuses primarily on two aspects: determining which parts of the input to prioritize and allocating limited processing resources to critical regions. The cross-channel coordinated attention mechanism uses variance and mean as independent variables to generate attention. By calculating the variance for each pixel in the image and adding it to the mean, the result is input into a multilayer perceptron to ultimately derive attention. During processing, the spatial attention mechanism selects the most relevant regions based on importance, improving task performance. The channel attention mechanism models the importance of each feature channel, enhancing or suppressing different channels for specific tasks. This mechanism allocates attention to each channel of the neural network, emphasizing or weakening different features. Complementary enhancements from different perspectives optimize the sampling positions of deformable convolution. The first, second, and third sub-features reflect characteristics of the image from distinct aspects. Their fusion produces an initial feature that is more accurate.

In some examples, extracting the first sub-feature via the cross-channel coordinated attention mechanism may include: determining the first sub-feature using the following formula:

$$y(p) = \sum_{k=1}^{K} \psi[w_k x(p + p_k + \Delta p_k) \Delta m_k]$$

Where y(p) represents the first sub-feature, $\psi$ represents applying the cross-channel coordinated attention mechanism to offsets generated by a deformable convolution to optimize sampling positions, $w_k$ represents a weight of a k-th position in a deformable convolution kernel, p represents the image, $p_k$ represents a predetermined offset at the k-th position of the deformable convolution kernel, $\Delta p_k$ represents a learnable offset at the k-th position of the deformable convolution kernel, $\Delta m_k$ represents a modulation scalar at the k-th position of the deformable convolution kernel, and x( ) represents an operation on the image.

In this example, the deformable convolution optimized by the CCA attention mechanism (DCN-CCA) may be used. Given a convolution kernel with K sampling positions, the output of the optimized deformable convolution is the first sub-feature. The CCA attention mechanism may enable feature extraction for targets with varying geometric shapes in the image, ensuring an accurate extraction of the first sub-feature even for geometrically diverse targets. Notably, in the recognition model, ordinary convolution may be combined with a BN (Batch Normalization) module and a SiLU (Sigmoid Gated Linear Unit) function to form a CBS module (comprising Conv, BN, and SiLU layers). The DCN-CCA may be combined with the BN module and SiLU function to form a DBS module. These modules are integrated into the backbone network of the recognition model (e.g., replacing the Darkneck module in C2 with a C2f-DC module) to strengthen its ability to capture features of targets with diverse geometric shapes.

In some examples, extracting the second sub-feature through the spatial attention mechanism may comprise: calculating the second sub-feature using the following formula:

$$g_c^h(i) = g_c^w(i) = \sigma_1(f_c^h(i) \times \tilde{f}_c^h(i)) \times \sigma_1(f_c^w(i) \times \tilde{f}_c^w(i))$$

Where $g_c^h(i) \times g_c^w(i)$ represents the second sub-feature, $\sigma_1$ represents a first Sigmoid activation function, $f_c^h(i)$ represents an image feature output in a vertical direction in a c-th channel of the recognition model, $\tilde{f}_c^h(i)$ represents a weight of the image feature output in the vertical direction in the c-th channel of the recognition model, $f_c^w(i)$ represents an image feature output in a horizontal direction in the c-th channel of the recognition model, and $\tilde{f}_c^w(i)$ represents a weight of the image feature output in the horizontal direction in the c-th channel of the recognition model.

In this example, the spatial attention mechanism may extract features by first generating coordinate-aware feature maps. For the input image, two distinct pooling kernels (H,1) or (1,W) encode each channel along the vertical and horizontal coordinates, respectively. These transformations allow the spatial attention mechanism to capture long-range dependencies in one spatial direction while retaining precise positional information in the other, aiding the network in accurately localizing objects of interest. Thus, the output of the c-th channel at height h and width w can be expressed as:

$$z_c^h(h) = \frac{1}{W} \sum_{0 \leq i \leq W} x_c(h, i),$$  formula (6)

$$z_c^W(w) = \frac{1}{H} \sum_{0 \leq i \leq H} x_c(j, w)$$  formula (7)

Next, a global receptive field may be established, and precise positional information may be encoded to generate a pair of aggregated feature maps. To fully utilize their rich representations, these maps may be concatenated and processed through a shared convolutional transformation function $Conv_{3 \times 1}$, which includes 3×1 convolution, batch normalization, and a SiLU activation function, ensuring input-output shape consistency:

$$f = Conv_{3 \times 1}([z^h, z^w])$$  formula (8)

Where [.,.] denotes concatenation along the spatial dimension. The resulting feature map f may be fed into a shared $Conv_{1 \times 1}$ to model complex feature relationships. A Sigmoid activation function then may map the convolutional output values to the range (0,1), generating weights for adjusting positional importance:

$$\tilde{f} = \sigma_3(Conv_{1 \times 1}(f))$$  formula (9)

Where the shapes of the intermediate coordinate feature map f and coordinate weights $\tilde{f}$ may be f, $\tilde{f} \in R^{C \times (H+W)}$. Further, f and $\tilde{f}$ may be split into two tensors along the spatial dimension: $f^h$, $\tilde{f}^h \in R^{C \times H}$ (vertical) and $f^w$, $\tilde{f}^w \in R^{C \times W}$ (horizontal). Intermediate features and weights may be obtained through an element-wise multiplication in the horizontal and vertical directions. The result is then mapped to the range (0,1) via the Sigmoid function to obtain:

$$g_c^h(i) = \sigma_1\left(f_c^h(i) \times \widetilde{f_c^h(i)}\right)$$  formula (10)

$$g_c^W(i) = \sigma_1\left(f_c^W(i) \times \widetilde{f_c^W(i)}\right)$$  formula (11)

Where x presents the element-wise multiplication. $g_c^h(i)$ and $g_c^W(i)$ may produce weighted feature maps for vertical and horizontal directions respectively. This focuses the attention of the algorithm on critical spatial coordinates, ensuring a precise extraction of the second sub-feature.

In some examples, extracting the third sub-feature through the channel attention mechanism may comprise calculating the third sub-feature using the following formula:

$$g_c = \sigma_2\left\{\left[\frac{1}{H \cdot W} \sum_{0 \leq i \leq H} \sum_{0 \leq j \leq H} x_c(i, j)\right] \times \left[\frac{1}{W + H} \sum_{i=1}^{W+H} \tilde{f}_c(i)\right]\right\}$$

Where $g_c$ represents the third sub-feature, $\sigma_2$ represents a second Sigmoid activation function, H represents a total height for encoding channels along the vertical direction, W represents a total width for encoding channels along the horizontal direction, $x_c(i,j)$ represents a coordinate of the image, and $\tilde{f}_c(i)$ represents a position weight of the image in the c-th channel of the recognition model.

In this example, the channel attention mechanism processes the input image XX by applying global average pooling and a convolutional transformation:

$$z_c^G(h, w) = \frac{1}{H, W} \sum_{0 \leq i \leq H} \sum_{0 \leq i \leq w} x_c(i, j)$$  formula (12)

$$f^G = \sigma_4(z^G)$$  formula (13)

Where $z_c^G$ represents a globally pooled feature and $f^G \in R^C$ represents an intermediate channel attention map. The channel attention weights may be computed as:

$$\hat{f}_c = \frac{1}{W + H} \sum_{i=1}^{W+H} \tilde{f}_c(i)$$  formula (14)

Where the channel attention weights $\hat{f} \in R^C$. Element-wise multiplication of $z_c^G$ and $\hat{f}_c$, followed by Sigmoid activation, produces the third sub-feature:

$$g_c = \sigma_2(z_c^G \times \hat{f}_c)$$  formula (15)

By leveraging the channel attention mechanism, the neural network assigns attention weights to each channel, thereby enhancing or suppressing different features in the data. This process ultimately leads to a more accurate third sub-feature.

In some examples, the first sub-feature, second sub-feature, and third sub-feature may be fused to obtain the initial feature by performing element-wise multiplications on the first sub-feature, second sub-feature, and third sub-feature. This integration combines features extracted from diverse perspectives, yielding an initial feature that robustly represents characteristics of the image and achieves preliminary feature extraction accuracy.

In this example, the first sub-feature, the second sub-feature and the third sub-feature may be multiplied so that the features extracted from the image from different angles can be fused to obtain the initial feature. The initial feature can represent the feature of the image better, and achieve the purpose of extracting the feature of the image initially and accurately.

In some examples, the recognition model may include a deformable convolution layer. Extracting intermediate features for the multiple groups of the initial feature may involve selecting one convolutional block from the deformable convolution layer randomly to process each group. This random selection of varying kernel sizes during depthwise convolution captures multi-scale receptive fields, enhancing the detection capability for multi-scale targets and ensuring precise intermediate features.

In this example, to enhance the detection capability of the recognition model for multi-scale targets in images, grouped feature extraction may be performed on the initial feature. Each group randomly selects convolutional kernels of different sizes for depth-wise convolution to capture multi-scale receptive fields, thereby improving the detection capability effectively for multi-scale features. This ensures a more precise intermediate feature acquisition.

It should be noted that the method in the examples of the present disclosure may be executed by a single device, such as a computer or server. The method in the examples may also be applied to a distributed scenario, where multiple devices cooperate to complete the method. In such a distributed scenario, one device among the multiple devices may execute only one or more steps of the method in the examples of the present disclosure, and the multiple devices interact with each other to complete the method.

It should be noted that the above descriptions address some examples of the present disclosure. Other examples fall within the scope of the appended claims. In some cases, the actions or steps recorded in the claims may be executed in an order different from that in the above examples and still achieve desired results. Additionally, the processes depicted in the drawings do not necessarily require the specific order or sequential order shown to achieve desired results. In some implementations, multitasking and parallel processing are permissible or may be advantageous.

Based on the same inventive concept and corresponding to any of the above method, the present disclosure further provides an image recognition device.

Figure 2:
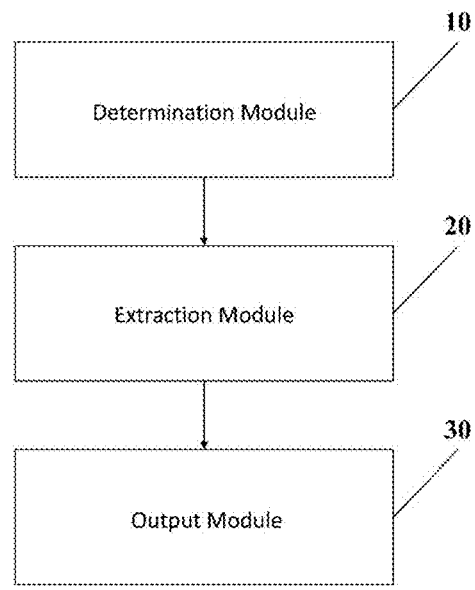
FIG. 2 is a structural diagram of an image recognition device according to an example of the present disclosure.

Referring to FIG. 2, the image recognition device may include:

A determination module 10, configured to acquire an image and input the image into a pre-constructed recognition model to determine an initial feature corresponding to the image through the recognition model.

An extraction module 20, configured to divided the initial feature into multiple groups according to a predetermined channel dimension, perform feature extractions on the multiple groups of the initial feature to obtain intermediate features corresponding to the multiple groups, and fuse the intermediate features to obtain a final feature.

An output module 30, configured to output a recognition result corresponding to the image through the recognition model based on the final feature.

Through the above image recognition device, the image may be acquired and input into the pre-constructed recognition model to determine the initial feature corresponding to the image, thereby achieving the purpose of determining the feature of the image preliminarily and accurately. By splitting the initial feature into multiple groups according to the predetermined channel dimension, performing feature extractions on the multiple groups of the initial feature to obtain intermediate features, and fusing all intermediate features to obtain the final feature, multi-scale receptive fields may be captured, thereby the detection capability for multi-scale features may be improved effectively, and the purpose of determining the final feature of the image accurately may be achieved. Based on the final feature, the recognition result of the image may be output through the recognition model, achieving the purpose of recognizing the image accurately.

In some examples, the determination module 10 may be further configured to perform a feature extraction on the image through a cross-channel coordinate attention mechanism to obtain a first sub-feature; perform a feature extraction on the image through a spatial attention mechanism to obtain a second sub-feature; perform a feature extraction on the image through a channel attention mechanism to obtain a third sub-feature; and fuse the first sub-feature, the second sub-feature, and the third sub-feature to obtain the initial feature of the image.

In some examples, the determination module 10 may be further configured to determine the first sub-feature through the following formula:

$$y(p) = \sum_{k=1}^{K} \psi[w_k x(p + p_k + \Delta p_k)\Delta m_k]$$

Where y(p) represents the first sub-features, $\psi$ represents applying the cross-channel coordinated attention mechanism to offsets generated by deformable convolution to optimize sampling positions, $w_k$ represents a weight of the k-th position in a deformable convolution kernel, p represents the image, $p_k$ represents a predetermined offset at the k-th position of the deformable convolution kernel, $\Delta p_k$ represents a learnable offset at the k-th position of the deformable convolution kernel, $\Delta m_k$ represents a modulation scalar at the k-th position of the deformable convolution kernel, and x( ) represents an operation on the image.

In some examples, the determination module 10 may be further configured to determine the second sub-feature through the following formula:

$$g_c^h(i) \times g_c^w(i) = \sigma_1(f_c^h(i) \times \tilde{f}_c^h(i)) \times \sigma_1(f_c^w(i) \times \tilde{f}_c^w(i))$$

Where $g_c^h(i) \times g_c^w(i)$ represents the second sub-feature, $\sigma_1$ represents a first Sigmoid activation function, $f_c^h(i)$ represents an image feature output in a vertical direction in a c-th channel of the recognition model, $\tilde{f}_c^h(i)$ represents a weight of the image feature output in the vertical direction in the c-th channel of the recognition model, $f_c^w(i)$ represents an image feature output in a horizontal direction in the c-th channel of the recognition model, and $\tilde{f}_c^w(i)$ represents a weight of the image feature output in the horizontal direction in the c-th channel of the recognition model.

In some examples, the determination module 10 may be further configured to determine the third sub-feature through the following formula:

$$g_c = \sigma_2 \left\{ \left[ \frac{1}{H \cdot W} \sum_{0 \leq i \leq H} \sum_{0 \leq j \leq H} x_c(i, j) \right] \times \left[ \frac{1}{W + H} \sum_{i=1}^{W+H} \tilde{f}_c(i) \right] \right\}$$

Where $g_c$ represents the third sub-feature, $\sigma_2$ represents a second Sigmoid activation function, H represents a total height for encoding channels along the vertical direction, W represents a total width for encoding channels along the horizontal direction, $x_c(i,j)$ represents a coordinate of the image, and $\tilde{f}_c(i)$ represents a position weight of the image in the c-th channel of the recognition model.

In some examples, the determination module 10 may be further configured to perform a product operation on the first sub-feature, the second sub-feature, and the third sub-feature to obtain the initial feature.

In some examples, the extraction module 20 may be further configured to, for each group of initial features, randomly select one convolutional kernel from all convolutional kernels in the deformable convolutional layer to perform a feature extraction on the group of the initial feature, to obtain the intermediate features.

For ease of description, the above apparatus is described by dividing functions into various modules. Of course, when implementing the present disclosure, the functions of the modules may be implemented in the same software and/or hardware or across multiple software/hardware components.

The device in the above example is used to implement the corresponding image recognition method in any of the preceding examples and has the beneficial effects of the corresponding method, which are not repeated here.

Based on the same inventive concept and corresponding to any of the above method, the present disclosure further provides an electronic device, comprising a memory, a processor, and a computer program stored on the memory and executable by the processor. The processor, when executing the program, implements the image recognition method as described in any of the preceding examples.

Figure 3:
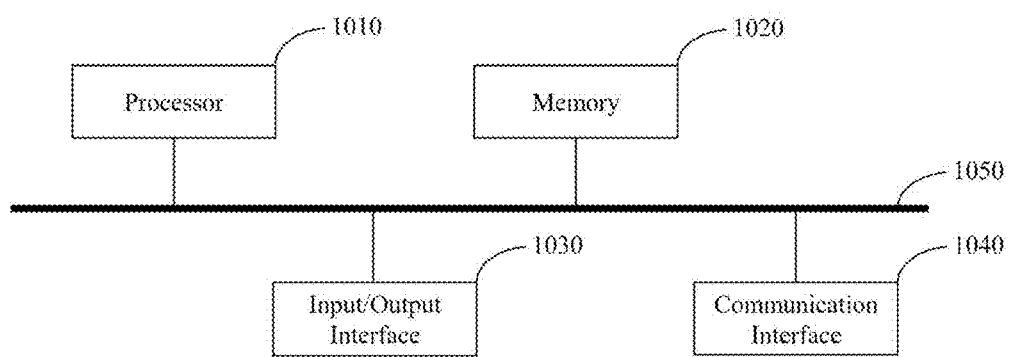
FIG. 3 is a hardware structure diagram of an electronic device according to an example of the present disclosure.

FIG. 3 illustrates a more detailed hardware structure diagram of an electronic device according to this example. The device may include: a processor 1010, a memory 1020, an input/output interface 1030, a communication interface 1040, and a bus 1050. The processor 1010, memory 1020, input/output interface 1030, and communication interface 1040 are communicatively connected within the device via the bus 1050.

The processor 1010 may be implemented using a general-purpose CPU (Central Processing Unit), microprocessor, ASIC (Application-Specific Integrated Circuit), or one or more integrated circuits. It is configured to execute related programs to implement the technical solutions provided in the examples of the present specification.

The memory 1020 may be implemented using ROM (Read-Only Memory), RAM (Random Access Memory), static storage devices, or dynamic storage devices. The memory 1020 stores operating systems and other applications. When implementing the technical solutions of the examples of the present specification via software or firmware, related program codes are stored in the memory 1020 and invoked by the processor 1010 for execution.

The input/output interface 1030 is connected to an input/output module to enable information input and output. The input/output module may be integrated into the device (not shown) or externally connected to provide corresponding functions. Input devices may include keyboards, mice, touchscreens, microphones, and various sensors. Output devices may include displays, speakers, vibrators, and indicator lights.

The communication interface 1040 is connected to a communication module (not shown) to enable communication between the device and other devices. The communication module may use wired methods (e.g., USB, network cables) or wireless methods (e.g., mobile networks, W i-Fi, Bluetooth).

The bus 1050 provides a pathway for transmitting information among components (e.g., processor 1010, memory 1020, input/output interface 1030, and communication interface 1040) of the device.

It should be noted that although the above device illustrates only the processor 1010, memory 1020, input/output interface 1030, communication interface 1040, and bus 1050, additional components necessary for normal operation may be included in practical implementations. Furthermore, those skilled in the art will understand that the device may include only components necessary for implementing the solutions of the examples of the present specification and need not include all components shown in the figure.

The electronic device in the above examples is used to implement the corresponding image recognition method in any of the preceding examples and has the beneficial effects of the corresponding method, which are not repeated here.

Based on the same inventive concept and corresponding to any of the above method, the present disclosure further provides a non-transitory computer-readable storage medium storing computer instructions. The computer instructions are configured to cause a computer to execute the image recognition method as described in any of the preceding examples.

The computer-readable medium in this example includes permanent and non-permanent, removable and non-removable media implemented by any method or technology for information storage. The information may be computer-readable instructions, data structures, program modules, or other data. Examples of computer storage media include, but are not limited to: phase-change memory (PRAM), static random-access memory (SRAM), dynamic random-access memory (DRAM), other types of RAM, read-only memory (ROM), electrically erasable programmable read-only memory (EEPROM), flash memory, other memory technologies, CD-ROM, DVD, other optical storage, magnetic cassettes, magnetic tape storage, other magnetic storage devices, or any other non-transitory media capable of storing information accessible to computing devices.

The storage medium in the above examples stores computer instructions for causing a computer to execute the image recognition method as described in any of the preceding examples, with the beneficial effects of the corresponding method, which are not repeated here.

Those skilled in the art should understand that the discussion of the above examples is exemplary and not intended to imply that the scope of the present disclosure (including the claims) is limited to these examples. Under the principles of the present disclosure, the technical features in the above examples or different examples may be combined, steps may be executed in any order, and many other variations exist as described in the different aspects of the examples of the present disclosure, which are not detailed for brevity.

Additionally, to simplify explanation and discussion and to avoid obscuring the examples of the present disclosure, known power/ground connections to integrated circuit (IC) chips and other components may or may not be shown in the provided figures. Furthermore, devices may be illustrated in block diagram form to avoid obscuring the examples, considering that implementation details of such block diagrams are highly platform-dependent (i.e., these details should be fully understandable to those skilled in the art). When specific details (e.g., circuits) are provided to describe exemplary examples of the present disclosure, it will be apparent to those skilled in the art that the examples may be practiced without these details or with modifications thereto. Thus, the descriptions are to be regarded as illustrative rather than restrictive.

Although the present disclosure has been described with reference to specific examples, many alternatives, modifications, and variations will be apparent to those skilled in the art based on the foregoing description. For example, other memory architectures (e.g., dynamic RAM (DRAM)) may be used in the discussed examples.

The examples of the present disclosure are intended to cover all such alternatives, modifications, and variations falling within the broad scope of the appended claims. Therefore, any omissions, modifications, equivalent substitutions, or improvements made within the spirit and principles of the examples of the present disclosure shall be included within the scope of protection of the present disclosure.

What is claimed is:

1. An image recognition method for vehicle recognition in an autonomous driving system, comprising:
   acquiring an image and inputting the image into a pre-built recognition model to determine an initial feature corresponding to the image via the recognition model; wherein, the image contains a vehicle;

dividing the initial feature into multiple groups according to a predetermined channel dimension, performing feature extractions on the multiple groups of the initial feature to obtain intermediate features corresponding to the multiple groups, and fusing the intermediate features to obtain a final feature;

outputting a recognition result corresponding to the image via the recognition model based on the final feature; wherein, the recognition result comprises the vehicle contained in the image;

the recognition model comprises a spatial attention mechanism, a channel attention mechanism, and a cross-channel coordinated attention mechanism; the step of determining the initial feature corresponding to the image via the recognition model comprises: performing a feature extraction on the image through the cross-channel coordinated attention mechanism to obtain a first sub-feature; performing a feature extraction on the image through the spatial attention mechanism to obtain a second sub-feature; performing a feature extraction on the image through the channel attention mechanism to obtain a third sub-feature; and fusing the first sub-feature, the second sub-feature, and the third sub-feature to obtain the initial feature of the image;

the step of performing the feature extraction on the image through the cross-channel coordinated attention mechanism to obtain the first sub-feature comprises: determining the first sub-feature by the following formula:

$$y(p) = \sum_{k=1}^{K} \psi[w_k x(p + p_k + \Delta p_k) \Delta m_k]$$

wherein, y(p) represents the first sub-features; $\psi$ represents applying the cross-channel coordinated attention mechanism to offsets generated by a deformable convolution to optimize sampling positions; $w_k$ represents a weight of a k-th position in a deformable convolution kernel; p represents the image; $p_k$ represents a predetermined offset at the k-th position of a deformable convolution kernel; $\Delta p_k$ represents a learnable offset at the k-th position of the deformable convolution kernel; $\Delta m_k$ represents a modulation scalar at the k-th position of the deformable convolution kernel; and x( ) represents an operation on the image;

$$g_h^c(i) \times g_c^w(i) = \sigma_1(f_c^h(i) \times \tilde{f}_c^h(i)) \times \sigma_1(f_c^w(i) \times \tilde{f}_c^w(i))$$

wherein, $g_c^h(i) \times g_c^w(i)$ represents the second sub-feature; $\sigma_1$ represents a first Sigmoid activation function; $f_c^h(i)$ represents an image feature output in a vertical direction in a c-th channel of the recognition model; $\tilde{f}_c^h(i)$ represents a weight of the image feature output in the vertical direction in the c-th channel of the recognition model; $f_c^w(i)$ represents an image feature output in a horizontal direction in the c-th channel of the recognition model; and $\tilde{f}_c^w(i)$ represents a weight of the image feature output in the horizontal direction in the c-th channel of the recognition model;

the step of performing the feature extraction on the image through the channel attention mechanism to obtain the third sub-feature comprises: determining the third sub-feature by the following formula:

$$g_c = \sigma_2 \left\{ \left[ \frac{1}{H \cdot W} \sum_{0 \le i \le H} \sum_{0 \le j \le H} x_c(i, j) \right] \times \left[ \frac{1}{W + H} \sum_{i=1}^{W+H} \tilde{f}_c(i) \right] \right\}$$

wherein, $g_c$ represents the third sub-feature; $\sigma_2$ represents a second Sigmoid activation function; H represents a total height for encoding channels along the vertical direction; W represents a total width for encoding channels along the horizontal direction; $x_c(i,j)$ represents a coordinate of the image; and $\tilde{f}_c(i)$ represents a position weight of the image in the c-th channel of the recognition model;

the step of fusing the first sub-feature, the second sub-feature, and the third sub-feature to obtain the initial feature of the image comprises: performing a multiplication process on the first sub-feature, the second sub-feature, and the third sub-feature to obtain the initial feature.

2. The method according to claim 1, wherein, the recognition model comprises a deformable convolution layer;
the step of performing feature extractions on the multiple groups of the initial feature to obtain intermediate features corresponding to the multiple groups comprises:
for each group of the initial feature, selecting one convolution kernel from all convolution kernels in the deformable convolution layer randomly to perform the feature extraction on the group of the initial feature to obtain the intermediate feature.

3. An electronic device, comprising a memory, a processor, and a computer program stored on the memory and executable by the processor, wherein, the processor, when executing the computer program, implements the image recognition method according to claim 1.

4. A non-transitory computer-readable storage medium storing computer instructions, wherein, the computer instructions are used to cause a computer to execute the image recognition method according to claim 1.

* * * * *